United States Patent
Sarris et al.

(10) Patent No.: US 11,381,940 B1
(45) Date of Patent: Jul. 5, 2022

(54) TETHERING COMPUTER PROGRAMS AND USER INTERFACES TO SELECTED TARGETS

(71) Applicant: Linqto Inc., Los Altos, CA (US)

(72) Inventors: William Sarris, Pebble Beach, CA (US); Jared Reed, St. George, UT (US); Erik J Thomas, Gold Beach, OR (US)

(73) Assignee: Linqto, San Francisco, CA (US)

( * ) Notice: Subject to any disclaimer, the term of this patent is extended or adjusted under 35 U.S.C. 154(b) by 0 days.

(21) Appl. No.: 16/360,011

(22) Filed: Mar. 21, 2019

Related U.S. Application Data

(63) Continuation of application No. 15/286,529, filed on Oct. 5, 2016, now Pat. No. 10,492,041.

(51) Int. Cl.
*H04W 4/21* (2018.01)
*H04W 4/60* (2018.01)
*H04L 29/06* (2006.01)
*H04L 67/01* (2022.01)

(52) U.S. Cl.
CPC .............. *H04W 4/21* (2018.02); *H04W 4/60* (2018.02); *H04L 67/42* (2013.01)

(58) Field of Classification Search
CPC ..... H04W 4/008; H04W 88/16; H04W 12/08; H04W 12/06; H04W 48/18; H04W 4/001; H04W 4/003; H04W 4/02; H04W 4/206; H04W 4/22; H04W 84/18; H04W 88/02; H04W 28/10; H04W 36/16; H04W 76/02; H04W 76/022; H04W 8/005; H04W 92/02
See application file for complete search history.

(56) References Cited

U.S. PATENT DOCUMENTS

| | | | | |
|---|---|---|---|---|
| 10,116,697 | B2 * | 10/2018 | Beckman | H04L 63/0428 |
| 10,290,133 | B2 * | 5/2019 | Straub | G06F 9/451 |
| 10,331,418 | B2 * | 6/2019 | Wood | G06F 8/60 |
| 11,099,840 | B2 * | 8/2021 | Ben-Yair | H04W 4/50 |
| 11,108,827 | B2 * | 8/2021 | Beckman | H04L 63/105 |

(Continued)

*Primary Examiner* — Liton Miah
(74) *Attorney, Agent, or Firm* — Los Altos Law

(57) ABSTRACT

A modified computer program for a mobile device, tethered for use with a specific server, including tethering data (metadata tethered to the specific server; features or functions tethered to the specific server). Servers can provide databases, remote processing or storage, virtual machines, or specialized hardware or software that performs specific functions. A method for developers to submit mobile apps for review and tethering by agents, who examine descriptions of, and possibly try out, those mobile apps. Agents can determine whether to modify a mobile app to tether (or re-tether) it, and if so, can provide tethering data. The system either recognize elements in the untethered mobile app that can be modified, and modify them to tether it; or, the system provides software hooks for execution from within the mobile app. The system automatically submits the tethered mobile app to an app store. Tethered mobile apps are modified to both end-user login and login to the tethered server at once. The system automatically recognizes when end-users download and use tethered mobile apps, alerts the developer of the mobile app, and automates payment from the server to the developer.

20 Claims, 7 Drawing Sheets

(56) References Cited

U.S. PATENT DOCUMENTS

| | | | | |
|---|---|---|---|---|
| 2010/0281475 A1* | 11/2010 | Jain | .................... | G06F 8/658 |
| | | | | 717/172 |
| 2012/0260232 A1* | 10/2012 | Hirsch | .................... | G06F 8/20 |
| | | | | 717/107 |
| 2013/0239086 A1* | 9/2013 | Brendza | .................... | G06F 8/38 |
| | | | | 717/109 |
| 2016/0350083 A1* | 12/2016 | Riebs | .................... | G06F 8/34 |
| 2017/0076306 A1* | 3/2017 | Snider | .................... | H04W 4/02 |

\* cited by examiner

Method 200

User Interface 300

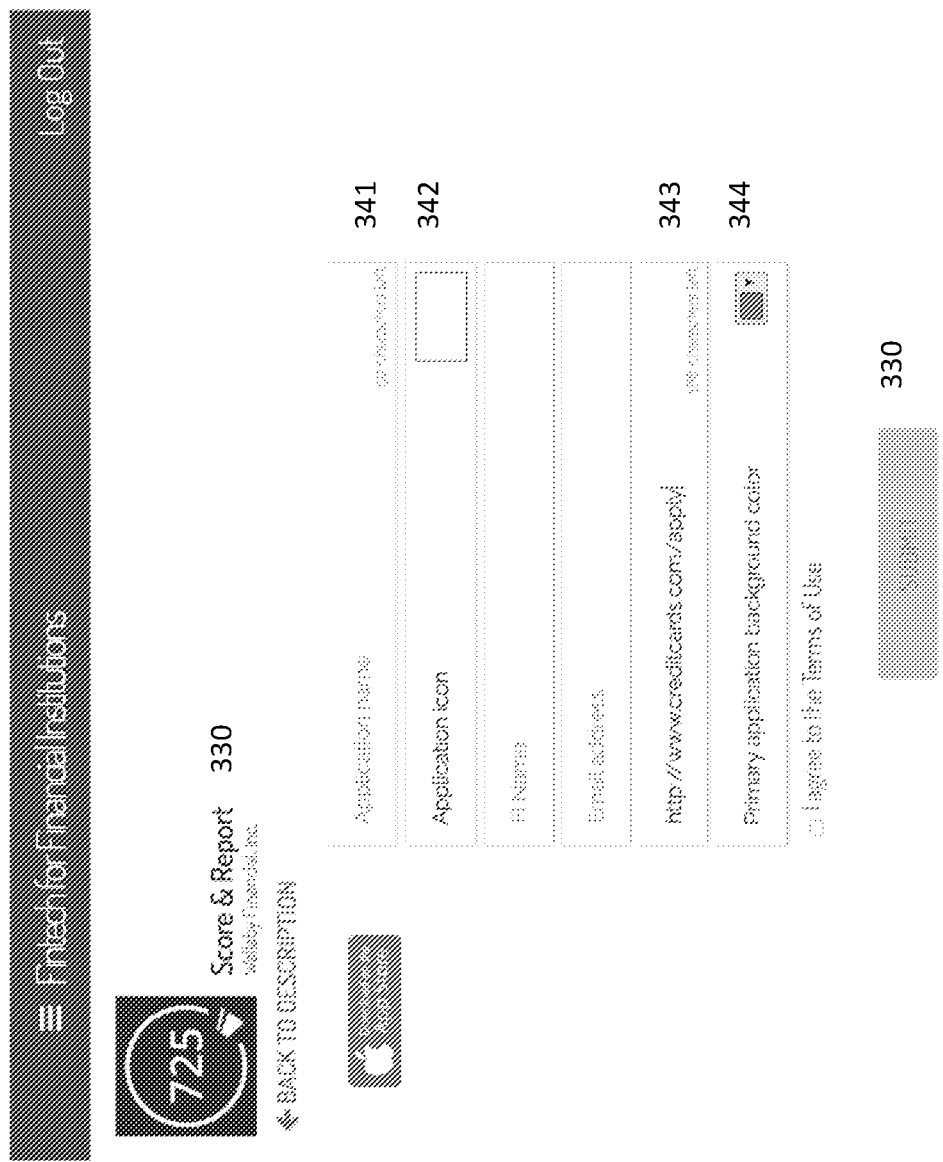

Entry 350

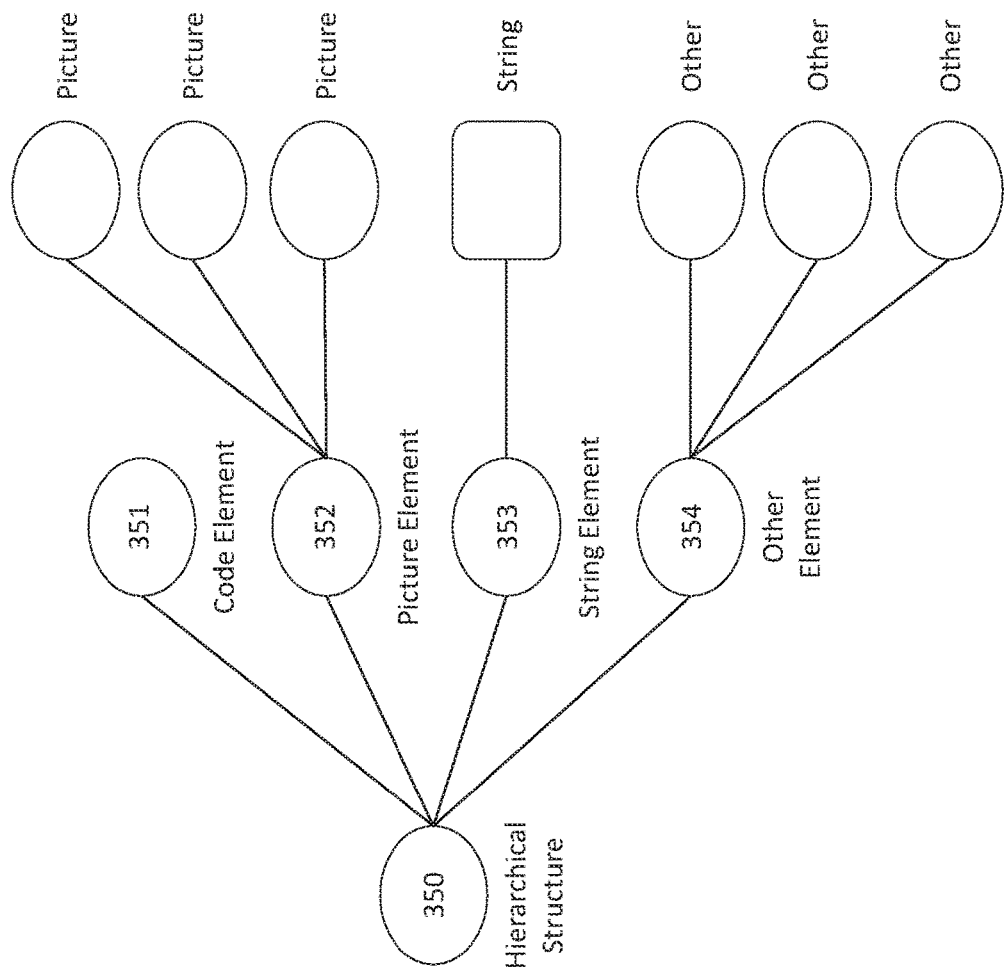

System 400

TETHERING COMPUTER PROGRAMS AND USER INTERFACES TO SELECTED TARGETS

TABLE OF CONTENTS

RELATED APPLICATIONS
BACKGROUND
SUMMARY OF THE INVENTION
BRIEF DESCRIPTION OF THE DRAWINGS
  DRAWINGS
  REFERENCE NUMERALS
DETAILED DESCRIPTION
  TERMINOLOGY
  FIGURES AND TEXT
  1A—DATA FLOW
  1B—METHOD OF TETHERING
  2A—INTERFACE TO TETHERING STORE
  2B—INTERFACE TO MODIFY MOBILE APP
  2C—DATABASE ENTRY
  2D—STRUCTURE OF APP PACKAGE FOR MOBILE APP
  3—SYSTEM
  ALTERNATIVE EMBODIMENTS
claims
ABSTRACT

RELATED APPLICATIONS

This Application is related to the following co-pending Application, hereby incorporated by reference as if fully set forth herein:
  U.S. application Ser. No. 14/756,728; filed Oct. 5, 2015; in the name of inventor William SARRIS (the same inventor); assigned to the same assignee.

BACKGROUND

FIELD OF THE INVENTION: This Application relates generally to tethering computer programs and user interfaces.

BACKGROUND OF THE INVENTION: Many businesses, sometimes called "targets" herein, desire to appeal to the customer audience sometimes called "Millennials," those persons who reached adulthood after about the year 2000. This particular customer audience, as well as other customer audiences, often prefer to conduct business or perform transactions using applications operating on mobile devices (such as the iPhone™ Android™, and other smartphones and similar devices), sometimes called "mobile apps" herein. These targets often desire to provide otherwise-common mobile apps with their own specific name, logo, or other branding elements. These targets often also desire to provide specific features or functions unique to themselves, not always generally available from other businesses.

While some targets have resources to create their own mobile apps, many smaller targets lack those resources. A smaller target might employ a third-party developer (called "third-party" because the developer is not the target and not its customer) to create a mobile app. However, this is subject to the problem that the third-party mobile app could take significant amounts of resources to create, with associated significant expense to the target. Moreover, whenever the target desired to update or upgrade the mobile app, it would have to pay the developer to do so. While the target could contract with the developer on a relatively long-term basis; however, this is subject to the problem of being relatively inflexible and expensive.

A particular target might alternatively desire to use a mobile app provided by a third-party developer to the general marketplace. However, this is subject to the problem that the third-party mobile app would be untethered to any particular target, thus failing to associate the mobile app in the marketplace with the particular target. The target would prefer to rebrand the untethered mobile app using its own particular branding elements. This would allow the particular target to offer to its customers (and potential customers) a mobile app tethered to that particular target with its own particular branding elements, thus specifically associated with that particular target.

A particular target might also desire to use an untethered mobile app and to provide specific features or functions unique to that target. However, this is subject to the problem that the third-party mobile app would have to be modified to include those specific features or functions. This could involve significant time and effort, either by the developer or by the target, to modify the mobile app to include those specific features or functions. Moreover, the target might not have the skills or resources to develop or maintain those specific features or functions.

One technological problem that has arisen is that it can take significant time and effort to modify an untethered mobile app to use specific features or functions (or to use branding elements) for a particular target, to provide a mobile app tethered to that particular target. The process of altering the name, logo, and splash screens of a mobile app; submitting the mobile app to a distribution server (such as the Apple App Store™), obtaining approval from the distribution server, and providing the newly tethered mobile app to customers and potential customers, can take several days. While this might not be unduly long for a single third-party mobile app for a single particular target, if the same third-party mobile app is in use by many targets, it can take quite some time for the average one of those targets to receive its own tethered version of that third-party mobile app. Moreover, the untethered third-party mobile app would be re-modified for use by each particular target, each time the third-party mobile app is updated or upgraded.

Another technological problem that has arisen is that modifying an untethered mobile app to include specific features or functions for a particular target might introduce errors or inconsistencies into the mobile app when tethered to the particular target. If the developer or the target has to check for consistency of each specific feature or function, this might severely limit the types of specific features or functions for cost-effectively tethering the mobile app to any particular target. Moreover, similar to branding elements, the untethered third-party mobile app would be re-modified to include specific features or functions for use by each particular target, each time the third-party mobile app is updated or upgraded.

Another technological problem that has arisen is that modifying an untethered mobile app to include branding elements, or to include specific features or functions, for a particular target, might involve both different modifications, and a different approval process for each different distribution server, and for each time the third-party mobile app is updated or upgraded. Thus, an untethered mobile app might have a first version for the Apple App Store™, a second version for Android™ smartphones, a third version for the Amazon Store™, and possibly other different versions for other types of mobile devices. Moreover, each of these different versions might have to be updated or upgraded each time the untethered mobile app or the operating system supporting the mobile devices has a design change. Since each target might wish to reach as wide an audience as it can, the untethered mobile app might be modified differently for each different distribution server or each different type of mobile device.

Another problem that has arisen is that each target, that wishes to modify an untethered mobile app to tether it to that particular target, must locate and obtain agreement from the developer of that untethered mobile app for rights to do so, or for rights to access the developer's code. This can involve time and effort to find the developer of the untethered mobile app; negotiate with the developer; and possibly re-negotiate with the developer each time the untethered mobile app is updated or upgraded, or modified for a new distribution server or type of mobile device, or when the developer provides a new untethered mobile app. Each target obtains monetary advantage from customers' use of mobile apps tethered to that particular target, so targets might find it valuable to have a relatively simple and easy method for obtaining rights to modify untethered mobile apps from developers. Further, developers might obtain monetary advantages from customers' use of mobile apps tethered to that particular target, so those developers might find it valuable to have a relatively simple and easy method to enable modification of their mobile apps to tether them to particular targets.

SOME DRAWBACKS OF THE KNOWN ART: Each of these issues, either alone or in combination with others (whether mentioned herein or otherwise), at some times, or in some conditions, can cause one or more problems with respect to modifying mobile apps to tether them with respect to particular targets, with respect to similar and other matters, or with respect to some combination or conjunction thereof.

SUMMARY OF THE INVENTION

This Application provides patentable subject matter that can ameliorate the problems described above, as well as others.

In one possible implementation, a system can provide an installable tethered mobile app (such an app package for that tethered mobile app), that is, a modified computer program, or an installable package for a modified computer program, for use on a mobile device (such as a smartphone or a portable, wearable, or implantable device) that is tethered for use with a selected target. When installed, the tethered mobile app can include tethering data; that is, the system can associate metadata with that untethered mobile app, wherein applying that associated metadata provides an tethered mobile app. The metadata can associate the mobile app with the selected target; the mobile app can specifically include metadata tethered to the selected target; the mobile app can specifically include new features or functions tethered to the selected target, even if those new features or functions were not accounted for by the developer of the original mobile app.

In one possible implementation, an app package for the tethered mobile app can be provided by a technique that includes: (1) receiving one or more app packages for a mobile app that can be tethered or re-tethered; (2) receiving tethering data with which to, at least partially, tether or re-tether the mobile app; (3) unpacking the app package, modifying the app package in response to the tethering data, and repacking the app package into a revised app package for a mobile app that is tethered to a selected target. These steps need not be performed serially or in any particular order.

Although this Application is primarily described with respect to use of a mobile app and an app package therefor, tethered to a selected target, that interacts with a server, in the context of the invention, there is no particular requirement for any such limitation. For example, the tethered mobile app can alternatively (in addition to or in lieu of the described operation) interact with one or more servers that are not controlled by the selected target, or can operate with other devices not already specified when the tethering data is received, or can operate independently without interaction with other devices. Although this Application is primarily described with respect to use of a tethered mobile app and an app package therefor, in the context of the invention, there is no particular requirement for any such limitation. For example, the modified computer program can alternatively (in addition to or in lieu of a mobile app or an app package therefor) include instructions executable or interpretable by another type of device (such as a laptop, a remote device, a server, a virtual machine, a cluster computer, a quantum computer, or another type of device capable of receiving and responding to instructions).

In one possible implementation, a system can provide a method for a developer to submit untethered (or re-tetherable) mobile apps, in executable or installable format, for review by one or more agents. Agents can examine descriptions of those mobile apps, and possibly examine operation of those mobile apps on their own mobile devices. Agents for a particular target can determine whether the target wishes to modify a mobile app to tether it and its associated app package (or re-tether an already tethered mobile app and its associated app package) to that selected target. If so, agents for the particular target can provide tethering data to tether the mobile app and its associated app package to that particular target.

The system can receive the tethering data and, in response thereto, automatically tether the mobile app and its associated app package to that selected target. In one possible implementation, the system can recognize elements in the app package for the untethered mobile app that can be modified to tether the mobile app (thereby tethering its associated app package) to the selected target. In another possible implementation, the system can provide developers' assistance software (such as an API, an application programming interface) that the developer can include within code intended to be executed or interpreted from within the mobile app. When the assistance software is executed or interpreted from within the tethered mobile app, the assistance software can, using the API, access at least some of the tethering data, with the effect of providing a mobile app that is tethered to the selected target.

In one possible implementation, the system can automatically submit the app package for the tethered mobile app to one or more distribution servers, such as the Apple App Store™, other mobile app download servers, and other locations from which the app package for the now-tethered mobile app can be downloaded and installed. For example, the system can automatically upload the app package for the tethered mobile app to any internet download server. End-users (customers or potential customers) can download the app package for the tethered mobile app to their mobile devices, install the tethered mobile app from its app package, and use the tethered mobile app. For example, end-users can use the installed tethered mobile app to access services from a server controlled by the selected target. The server controlled by the selected target need not have anything to do with the system, other than operating successfully with the tethered mobile app. In another possible implementation, untethered mobile apps that provide the capability for end-users to sign on to the apps can be modified to also sign on to the server controlled by the selected target (such as by using the same user ID and password).

In one possible implementation, the system can automatically recognize when end-users download the app package for the tethered mobile app, install the tethered mobile app from its app package, and when end-users use the tethered mobile app. The system can alert the developer, and also alert the selected target, that the tethered mobile app has been downloaded, installed, or used. The system can provide automated billing or payment from the target to the developer or vendor. Automated billing, or automated payment, can be performed in response to when the end-user downloads the app package for the tethered mobile app, installs the tethered mobile app, first uses the tethered mobile app, or for each transaction or other measure of use of the tethered mobile app by the end-user.

POSSIBLE APPLICABILITY: After reading this Application, those skilled in the art would recognize that many variations of techniques shown in this Application are possible that would be workable, are within the scope and spirit of the invention, and would not require undue experiment or further invention. The characteristics and possible utility of the embodiments described in this Application are not all-inclusive. Those skilled in the art would recognize both additional advantages and additional features beyond those explicitly shown or suggested in this Application.

After reading this Application, those skilled in the art would also recognize that techniques shown in this Application are applicable to more than just the specific embodiments shown herein. The examples described herein are not intended to be limiting in any way. One or more combinations of these examples, in whole or in part, are also possible.

BRIEF DESCRIPTION OF THE DRAWINGS

Drawings

FIG. 2B shows a conceptual drawing of an interface to modify mobile apps.
FIG. 2D shows a conceptual drawing of a structure of an app package for a mobile app.

Figure 1A:
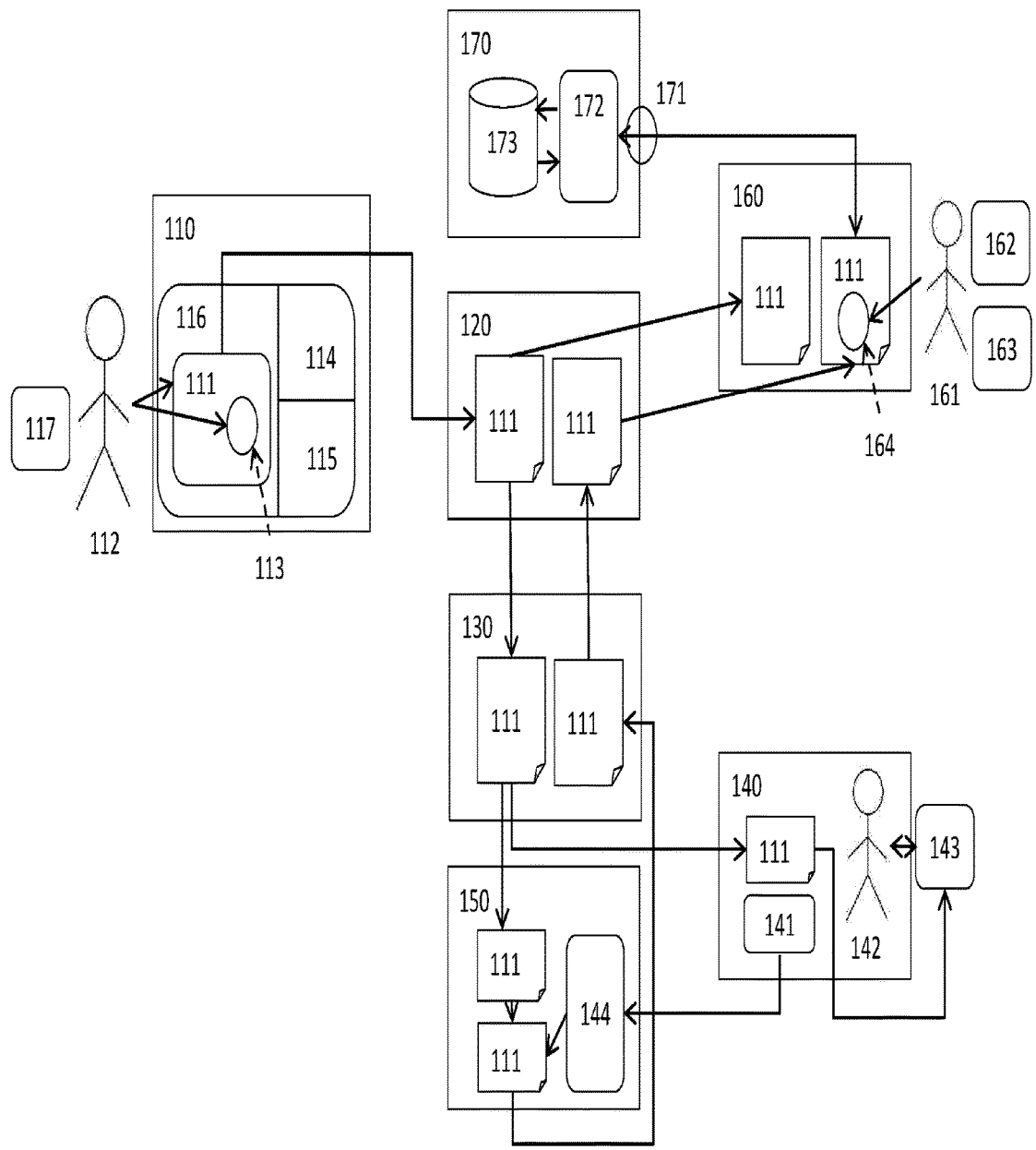
FIG. 1A shows a conceptual drawing of a dataflow process.

After reading this Application, those skilled in the art would recognize that the figures are not necessarily (1) drawn to scale for construction, or (2) specify any particular location or order of construction. After reading this Application, those skilled in the art will recognize that many alternatives, in construction, shape, size, and otherwise, would allow them to make and use the invention, without undue experiment or further invention.

REFERENCE NUMERALS

In the figures, like references generally indicate similar elements, although this is not strictly required. The following reference numerals are exemplary, and not exhaustive:

100—dataflow process
110—developer site
   111—mobile app
   112—developer
   113—locations at which the mobile app can be modified
   114—processor
   115—storage
   116—development environment
   117—developer mobile device
120—app store: repository for mobile apps for use by end-users
130—tethering store: repository for mobile apps for use by agents
140—agent station
   141—thin client: user interface to the agent station
   142—agent: persons authorized to use the agent station
   143—agent mobile device: mobile device for use by agent
   144—tethering data: information to modify or update mobile app
150—tethering server
160—end-user station
   161—end-user
   162—end-user mobile device
   163—other end-user device: processing device other than mobile device
   164—sign-on data
170—app server: server tethered mobile app interfaces with
   171—sign-on interface
   172—user interface
   173—databases: end-user account information
   174—end-user accounts
180—communication network
300—user interface for agent
   310—app descriptor
   320—app metadata
      321—app name
      322—app icon
      323—app description
   330—fields: into which tethering data can be inserted
      331—new name
      332—new icon
      333—new other metadata
      334—new values or pointers to new values
      335—new features or functions
   340—database entry
   350—hierarchical structure
      351—code elements
      352—picture elements
      353—string elements
      354—other elements: possibly URLs or other values

DETAILED DESCRIPTION

Terminology

The phrases and terms "end-user", and variants thereof, refer to one or more operators who can use a mobile device and one or more of its mobile apps. In one possible implementation, the end-user can be one or more persons associated with the mobile device, such as an owner of a smartphone or other device (that is, a portable, wearable, or implantable device). Alternatively, the end-user can be one or more automated devices or programs of instructions capable of interfacing with the mobile device, such as an artificial intelligence or machine learning element (examples of which might include Apple Corporation's Siri™ system and IBM Corporation's Watson™ product, or products built using Alphabet Corporation's TensorFlow™ software).

The phrases and terms "mobile app", and variants thereof, refer to one or more computer programs, or one or more sets of instructions and data, executable or interpretable by any information processing device. For example, a mobile app can be disposed to operate on a mobile device; a portable, wearable, or implantable device; a laptop; a remote device; a server; a virtual machine; a cluster computer; a quantum computer; or another type of device capable of receiving and responding to instructions).

The phrases and terms "mobile app", and variants thereof, such as when used in conjunction with the phrases and terms "app package", and variants thereof, can refer to a downloadable or installable format for the mobile app. The app package for a mobile app is not itself executable, but can be used to install a format for the mobile app that is executable or interpretable. When this Application refers to tethering a mobile app, it means and refers to modifying the app package for the mobile app, with the effect that when that app package is installed, the resulting tethered mobile app is a modified version of the untethered (or re-tetherable) mobile app.

The phrases and terms "target", and variants thereof, refer to one or more entities that a mobile app can be tethered to; thus, a mobile app is tethered to the selected target. While the Application primarily describes targets whose agents tether mobile apps to that selected target, in the context of the invention, there is no particular requirement for any such limitation. For example, the target can outsource the procedure of tethering mobile apps, with the effect that an outsourced tethering provider can tether one or more mobile apps to the same target, at the request of that target. In possible implementations, the target can include any business entity (such as a retailer or wholesaler of goods, or a service business such as a financial institution or transport carrier), any non-business entity (such as a charitable or educational institution or an entertainer such as an actress, sports team, or an industry organization), or any collection of users that is itself not formally organized (such as a membership organization, or a group of individuals with related interests).

The phrases and terms "channel", and variants thereof, refer to one or more entities providing a tetherable mobile app, such as either (1) an untethered mobile app not associated with any particular target and capable of being tethered to one or more selected targets, or (2) a tethered mobile app capable of being re-tethered to a different one or more selected targets. In one possible implementation, the channel can include a representative of a collection of possible targets (such as an industry association of businesses with related or similar products or services; an association of non-business entities representing end-users with related or similar interests; or an informal association of groups of related or similar end-users such, as a council of churches or a grouping of sports fans).

The phrases and terms "developer", "vendor", and variants thereof, refer to one or more entities providing a mobile app, such as (1) instructions and data capable of being parsed, executed, or interpreted, by a computing device or other device; (2) source code capable of being compiled, translated, or interpreted, by a computing device or other device; or (3) an application package capable of being unpacked and reformatted into either instructions and data or source code. In one possible implementation, the developer creates the mobile app or components thereof, while the vendor distributes the mobile app or components thereof.

The phrases and terms "server", "app server", and variants thereof, refer to one or more devices providing a service to a mobile app. In this context, a "device" can include one or more hardware or software devices, operating in combination or conjunction, or wherein portions thereof operate independently from the remainder of the whole device. For example, the app server can include one or more chatbots, chess servers, database servers, email servers, remote processing devices or storage devices, virtual machines, or specialized hardware or software that performs specific functions on behalf of the mobile app or the end-user. The app server can be provided by the target, or by another party, or even not at all. For example, the mobile app need not operate in conjunction with any particular server, or can operate independently of any server (that is, the mobile app can operate without making requests of any server).

The phrases and terms "app package", and variants thereof, refer to one or more data elements capable of being unpacked and reformatted into a mobile app. In one possible implementation, the app package includes one or more of (1) tethering data, as otherwise and further described herein; (2) locations at which tethering data can be inserted or replaced. In one possible implementation, an app package can include one or more separate data elements, collected into a single element using a compression program. For example, the compression program can provide a single compressed element encoded as a ZIP file or using another compressed format.

The phrases and terms "tethering data", and variants thereof, refer to one or more items of information that can be associated with, included in, or part of features or functions included in, a tethered mobile app or an app package that can be unpacked and reformatted into a tethered mobile app. For example, tethering data can include: one or more names or icons associated with a mobile app; one or more images associated with or included within a mobile app; one or more color values or string constants included within a mobile app; one or more URLs, embedded web pages, telephone numbers or other numeric values, one or more addresses of physical locations, or other resource pointers included within a mobile app; one or more sets of authentication information, authorization codes, encryption/decryption codes, public/private authentication keys, sign-on data, or other special information included within a mobile app; one or more code segments (whether source code, object code, or interpretable instructions) included within a mobile app; or any other information suitable to tether the mobile app to a specific target.

The phrases and terms "tethered", "tethering", "re-tethering", "untethered", refer to one or more techniques for modifying a mobile app, such as using the methods and systems otherwise and further described herein, to alter metadata associated with or inserted into that mobile app; or to modify, add to, or subtract from, features or functions associated with that mobile app; with the effect that the mobile app is particularized to a specific target.

Figures and Text

1A—Data Flow

FIG. 1A shows a conceptual drawing of a dataflow process.

A dataflow process can include data flows shown in the figure, such as at least those described with respect to the following: a developer site 110, an app store 120, a tethering store 130, an agent station 140, a tethering server 150, an end-user station 160, an app server 170, and other elements necessary or convenient to give effect to the functions described herein.

The dataflow process described herein includes maintaining data and metadata at logical locations, sending that data and metadata between those logical locations, and manipulating that data and metadata at one or more of those logical locations. In one particular embodiment, at least some types of data or metadata can be encoded, such as encoding images in GIF or JPEG format, such as encoding binary data in (base 64) UUencoded format, such as encoding URL values in string format or IP addresses. In such cases, any known type of value can be encoded in any format known for that type of value, whether presently known or otherwise.

DEVELOPER SITE: The developer site 110 can include a mobile app 111 created by a developer 112, in one or more of (1) an executable or interpretable format, that is, the mobile app 111 itself, or (2) a downloadable or installable format, that is, an app package for the mobile app 111. The mobile app 111 can include one or more locations 113 at which the mobile app 111 can be modified by inserting tethering data (as otherwise and further described herein).

While this Application is primarily described with respect to a developer 112 directly uploading an app package for a mobile app 111 to the app store 120, in the context of the invention, there is no particular requirement for any such limitation. For example, the developer 112 can upload the app package for the mobile app 111 to a download server (not shown), which can be independent of the elements shown herein, and can be accessed directly either by agents 142 or by end-users 161. For another example, the developer 112 can upload the app package for the mobile app 111 directly to the tethering store 130, either in addition to or in lieu of uploading the app package for the mobile app 111 to the app store 120.

For another example, the developer 112 can send the app package for the mobile app 111 to a vendor (not shown), that is, an entity independent of the developer 112, the agent 142, or the end-user 161. The vendor can publish the mobile app 111 (using the app package for sending the mobile app 111) as otherwise and further described herein with respect to the developer 112, in addition to or in lieu of the developer 112. In such cases, the developer 112 might obtain some business advantage from outsourcing publication of the mobile app 111 to the vendor, for which the developer 112 might pay the vendor, or might split the proceeds from the mobile app 111 with the vendor.

APP STORE: The app store 120 can include one or more mobile apps 111, possibly including untethered mobile apps 111 and tethered mobile apps 111.

For example, the app store 120 can receive mobile apps 111 and their associated app packages from the developer site 110 (or, as described above, otherwise from the developer 112, or from the vendor). In such cases, operators (not shown) associated with the app store 120 can review the mobile apps 111 that are received (whether untethered or tethered) and can approve those mobile apps 111 for download by end-users 161.

In such cases, the app store 120 can receive those app packages for mobile apps 111 in a format that allows those apps to be installed on mobile devices, and after installation, to be executed or interpreted on those mobile devices. The mobile apps 111 and their associated app packages (regardless of format) can be received in association with metadata, such as descriptive information about the mobile app 111, information for use by the mobile app 111, and other metadata (as otherwise and further described herein).

The app store 120 can also receive mobile apps 111 and their associated app packages from the developer site 110, not necessarily by intervention of other data flows described herein. This can occur when the developer 112 has provided a mobile app 111 that has already been tethered to a selected target, such as a mobile app 111 that was originally written to be tethered to that target, but which includes metadata allowing the system to re-tether that mobile app 111 to a revised target. This can also occur when the developer 112 has provided a tethered mobile app 111 and associated app package that is already tethered to a selected target, but which can still be modified to be tethered to a different target.

TETHERING STORE: A tethering store 130 can include one or more mobile apps 111, possibly including untethered mobile apps 111 and tethered mobile apps 111. More specifically, the tethering store 130, similarly to the app store 120, is said to "include mobile apps" when it includes app packages for those mobile apps 111. The tethering store 130 can receive untethered mobile apps 111 from the app store 120. In such cases, the tethering store 130 can present those untethered mobile apps 111 to one or more agents 142. "Presenting" a mobile app may include, without limitation, informing the agents about the availability of the app, providing descriptive information about the app, providing screenshots of the app's operation, or providing an installable version of the corresponding app package for evaluation. The tethering store 130 need not conduct or support any financial transactions.

While this Application describes the tethering store 130 as "presenting" untethered (or re-tetherable) mobile apps 111 to one or more agents 142, in the context of the invention, there is no particular requirement that the tethering store 130 takes any action to present untethered (or re-tetherable) mobile apps 111 to those agents 142. For example, the tethering store 130 can merely make app packages for those mobile apps 111 available to those agents 142 when the latter explicitly request them, or when the latter explicitly request a list of available mobile apps 111.

AGENT STATION: The agent station 140 can include a "thin" client 141, such as a web browser or similar user interface, with which the agent 142 can interact with the tethering store 130. In one possible implementation, the agent 142 can have a number of options: The agent 142 can review untethered mobile apps 111, such as by reading their descriptions and viewing associated screenshots. The agent 142 can examine untethered mobile apps 111, such as by downloading and installing them, and testing them on one or more mobile devices associated with the agent 142. The agent 142 can request untethered mobile apps 111 to be tethered to the particular target, as otherwise and further described herein.

In one possible implementation, the agent station 140 can include an agent mobile device 143, such as a smartphone or any other type of mobile device as otherwise and further described herein. In such cases, the agent 142 can download one or more app packages associated with mobile apps 111 (whether untethered mobile apps 111 or tethered mobile apps 111) to the agent mobile device 143. Once the mobile apps 111 are installed and maintained on the agent mobile device 143, the agent 142 can use the mobile apps 111 on the agent mobile device 143 to access an app server 170, and can operate the mobile apps 111, examining those mobile apps 111 as they operate. This can have the result that the agent 142 can determine whether the mobile apps 111 would attract customers or potential customers of the target.

In one possible embodiment, the agent station 140 can receive tethering data 144 from the agent 142. Tethering data 144 can include metadata with respect to the mobile app 111, such as new values for: its name, its display icon, or other information not part of operation of the mobile app 111. Tethering data 144 can also include data with respect to operation of the mobile app 111, such as new values for: one or more splash screens or portions thereof (such as a logo representative of a target), such as one or more color values to be used by the mobile app 111, or such as other information used during operation of the mobile app 111. Tethering data 144 can also include data with respect to features or functions of the mobile app 111, such as specifications of new functions to be performed, new variables to be maintained (for example, user name and password for the selected target), new code to be executed or interpreted upon selected conditions (for example, new requests possible to make to the app server 170), or other operations of the mobile app 111 not necessarily built in by the developer 112.

TETHERING SERVER: The tethering server 150 can include copies of one or more mobile apps 111 (whether untethered mobile apps 111 or tethered mobile apps 111 that can still be tethered to a different target, as otherwise and further described herein). The tethering server 150 can receive the copies of mobile apps 111 from the tethering store 130. The tethering server 150 can also include copies of tethering data 144 received from the thin client 141. In one possible implementation, the tethering server 150 can modify the app package for an untethered mobile app 111, using the tethering data 144, to provide an app package for a tethered mobile app 111, tethered to a particular target. In such cases, the tethering server 150 can also include the resulting tethered mobile app 111 and its associated tethered app package. In one such case, the agent 142 can examine the tethered mobile app 111, in a similar manner as described above with respect to the agent 142 examining the untethered mobile app 111.

END-USER STATION: The end-user station 160, associated with an end-user 161 (such as a customer or a potential customer of a particular target), can include a tethered mobile app 111, tethered to that particular target. The end-user station 160 can also include an end-user mobile device 162, such as a smartphone or any other type of mobile device as otherwise and further described herein. The end-user station 160 can receive the tethered mobile app 111 from the app store 120, such as by downloading and installing an app package for the mobile app 111 to the end-user mobile device 162 from the app store 120 in a known manner. In such cases, the end-user station 160 can also receive an app package for the tethered mobile app 111 from another source (not shown), or from another end-user device 163, such as a laptop, desktop, wearable or implantable device, or other computing device or storage device capable of maintaining the tethered mobile app 111. The end-user station 160 can also include an untethered mobile app 111, also received from the app store 120, or from another source, and maintained at the end-user mobile device 162, or at another end-user device 163.

The end-user station 160 can also include, either at the end-user mobile device 162, or at another end-user device 163, one or more sets of sign-on data 164 (such as a user name, account number, phone number, or other identifying or authorization information; and such as a password, biometric information, secondary device identifier, or other authentication information). In such cases, the end-user station 160 can initiate or sign into the tethered mobile app 111 using the sign-on data 164, and can couple to the app server 170, using the same (or an associated set of) sign-on data 164. This can have the effect that the end-user 161 only signs-on to the tethered mobile app 111 a single time, and need not sign-on to the app server 170 using a second copy of the same or similar sign-on data 164.

APP SERVER: The app server 170 can include a sign-on interface 171, which can be disposed to identify and authenticate the end-user 161, such as by receiving the sign-on data 164 from the end-user mobile device 162, and determining if the end-user mobile device 162, using the tethered mobile app 111, is allowed to access the specified accounts (such as the end-user's accounts) at the app server 170. The app server 170 can also include a user interface 172, which can interface with the end-user 161 and the end-user mobile device 162 using the tethered mobile app 111 (or possibly using an untethered mobile app 111 not tethered to the target). The app server 170 can also include one or more databases 173 of end-user account information, such as might be used to provide services to the end-user 161.

While this Application primarily describes a system in which the end-user 161 operates the tethered mobile app 111 with the app server 170, in the context of the invention, there is no particular reason for any such limitation. For example, the tethered mobile app 111 could operate with whatever other devices it might choose, including without limitation: (A) its choice of servers at the moment of operation, (B) its choice of other mobile devices at the moment of operation, (C) any other device, such as a portable, wearable, implantable, or other connectable device, or (D) no such other device, such as when the mobile app 111 operates on its own.

For an example of type "A," the mobile app 111 might include an internet browser. For an example of type "B," the mobile app 111 might include a mobile device messaging app. For an example of type "C," the mobile app 111 might include an exercise measuring app. For an example of type "D," the mobile app 111 might include a game app.

1B—Method of Tethering

Figure 1B:
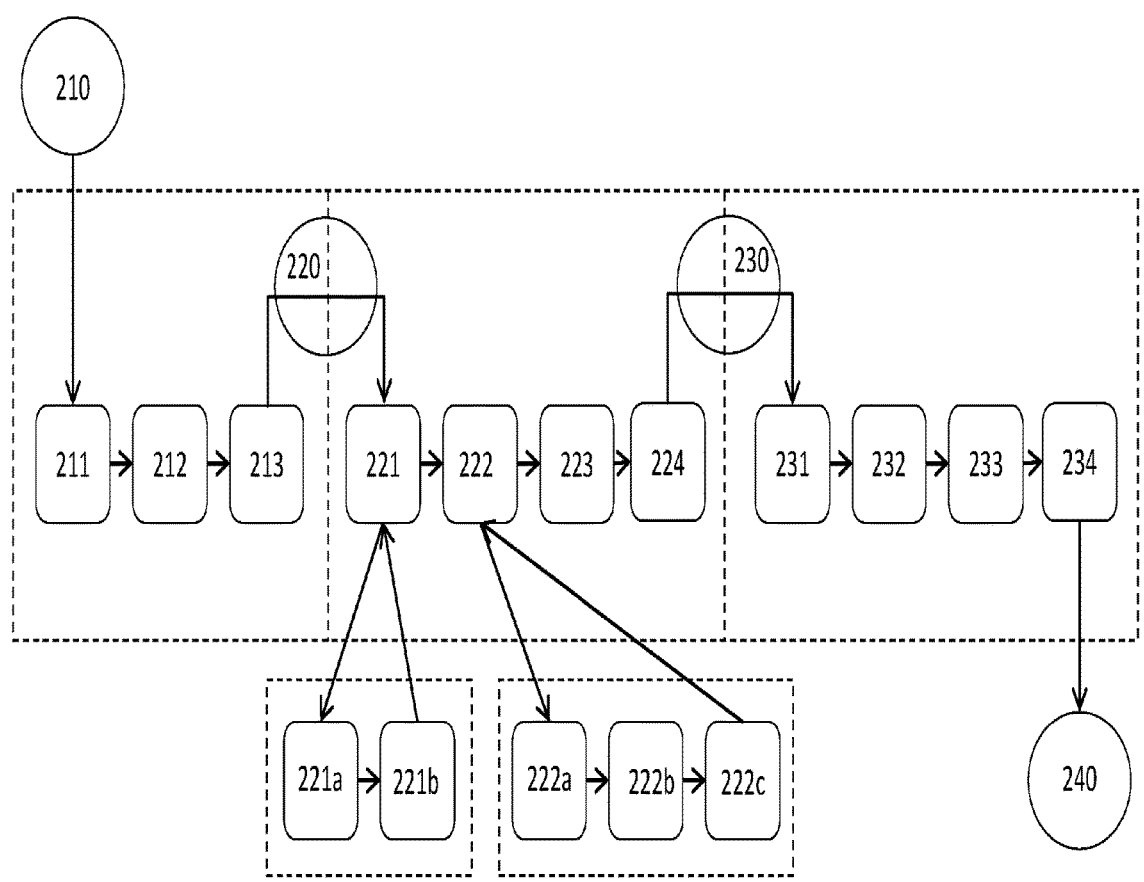
FIG. 1B shows a conceptual drawing of a first method.

FIG. 1B shows a conceptual drawing of a first method.

A method 200 of tethering (or re-tethering) a mobile app 111 to provide a tethered mobile app 111, tethered to a particular selected target, can include flow labels and method steps as otherwise and further described herein. In one possible implementation, the flow labels are encountered and the method steps are performed in an order as otherwise and further described herein. However, in the context of the invention, there is no particular requirement for any such limitation. For example, the method steps can be performed in another order, in a parallel or pipelined manner, or otherwise.

In one possible implementation, the flow labels are encountered and the method steps are performed by elements of a system, including elements described with respect to dataflow in FIG. 1A. However, it is possible for the flow labels to be encountered or the method steps to be performed by alternative elements, or by more than one such element operating in combination, or otherwise. In some cases herein, the flow labels can be said to be encountered or the method steps can be said to be performed by the method 200.

RECEIVING UNTETHERED MOBILE APPS: At a flow point 210, the method 200 is ready to ready to receive one or more untethered (or re-tetherable) mobile apps 111 from developers 112 (or vendors).

At a step 211, the developer 112 (or vendor) submits one or more untethered (or re-tetherable) mobile apps 111 to the app store 120. In such cases, the developer 112 sends one or more mobile apps 111 and their associated app packages to the app store 120. Operators (not shown) for the app store 120 approve those mobile apps 111, in response to which the app store 120 presents the app packages for mobile apps 111 for download. While this Application describes the app store 120 as presenting those app packages for mobile apps 111 for download, in the context of the invention, there is no requirement for the app store 120 to take any particular action. The app store 120 can merely make itself ready to respond to requests for those mobile apps 111 from anyone desiring to download app packages for mobile apps 111, or can merely make itself ready to respond to requests for a list of mobile apps 111 available for download.

At a step 212, the developer 112 submits one or more untethered mobile apps 111, in their original app package format, as approved by the app store 120, to the tethering store 130. While this Application primarily describes the developer 112 (or vendor) directly submitting app packages for untethered (or re-tetherable) mobile apps 111 for download, in the context of the invention, there is no particular requirement for any such limitation. For example, the app store 120 can send those app packages for mobile apps 111 to the tethering store 130, in response to receiving them. For another example, the tethering store 130 can, periodically, in response to a triggering event, or otherwise from time to time, request app packages for mobile apps 111 from the app store 120.

At a step 213, the tethering store 130 presents availability of the untethered mobile apps 111 to the agent station 140. While this Application describes the tethering store 130 as presenting those app packages for mobile apps 111 to the agent station 140 for download, in the context of the invention, there is no requirement for the tethering store 130 to take any particular action. The tethering store 130 can merely make itself ready to respond to requests for those mobile apps 111 from the agent station 140 desiring to download app packages for mobile apps 111, or can merely make itself ready to respond to requests from the agent station 140 for a list of mobile apps 111 available for download.

TETHERING MOBILE APPS TO TARGETS: At a flow point 220, the method 200 is ready to tether one or more untethered mobile apps 111 to provide tethered mobile apps 111, each tethered to a selected target.

At a step 221, the agent 142 invokes an interface between the agent station 140 and the tethering store 130. As otherwise and further described herein, the interface can include a relatively "thin" client, such as a web browser or similar user interface. However, in the context of the invention, there is no particular requirement for any such limitation. Alternatively, the interface between the agent station 140 and the tethering store 130 can include a relatively robust interface environment at the agent station 140.

For example, the interface environment at the agent station 140 can maintain activity records on behalf of the agent 142, can maintain status information and variable values on behalf of the agent 142, can perform automated functions on behalf of the agent 142, and can perform other functions at the agent station 140. In such cases, one such automated function can include periodically (or in response to a condition or signal, or otherwise from time to time) checking the app store 120 or the tethering store 130 for new untethered mobile apps 111, and alerting the agent 142 in response thereto.

For another example, the interface environment at the agent station 140 can call upon logically remote elements, such as a database server (not shown) or another server (not shown) that performs functions relating to particularizing untethered mobile apps 111 to provide tethered mobile apps 111 tethered to the agent's associated target.

When the agent 142 at the agent station 140 interacts with the tethering store 130, this step can be performed in two parts: a part 221*a* and a part 22 1*b*.

At the part 221*a*, the agent 142 selects one or more untethered mobile apps 111 from the presentation made by the tethering store 130. For example, if the tethering store 130 presents (such as presenting the availability of) untethered mobile apps 111 to the agent 142, the agent 142 can select one, some, or all of those untethered mobile apps 111 to be particularized. In such cases, the tethering store 130 and the agent station 140 can cooperate to provide the agent 142 with an agent interface such as that shown in FIG. 2A herein.

At the part 221*b*, the agent 142 provides tethering data 144 for use in particularizing untethered mobile apps 111 and their associated app packages, to modify them to be tethered to the agent's associated target.

Tethering data 144 can include metadata with respect to the mobile app 111, such as new values for: its name, its display icon, or other information not part of operation of the mobile app 111.

Tethering data 144 can also include data with respect to operation of the mobile app 111, such as new values for: one or more splash screens, one or more color values to be used by the mobile app 111, or other information used during operation of the mobile app 111.

Tethering data 144 can also include data with respect to features or functions of the mobile app 111, such as specifications of new functions to be performed, new variables to be maintained (for example, user name and password for the app server 170), new code to be executed or interpreted upon selected conditions (for example, new requests possible to make to the app server 170), or other operations of the mobile app 111 not necessarily built in by the developer 112.

This can have the effect of providing tethered mobile apps 111 that are tethered to the agent's associated target. For example, mobile apps 111 that have been modified with tethering data 144 can thus have features or functions specific to the target, with the effect of becoming recognizably tethered mobile apps 111. For another example, mobile apps 111 that have been modified with tethering data 144 can thus have metadata integrated into an app package associated with the mobile app 111, such as app icons, splash screens, informative messages, URL pointers to specific app servers 170 or other servers (such as a pointer to an offer for a new credit card), with the effect of becoming recognizably tethered mobile apps 111.

In such cases, the agent 142 can enter tethering data 144, or can enter a reference to tethering data 144. The tethering data 144 can be directly transferable on behalf of the agent station 140, as otherwise and further described herein with respect to FIG. 1A, or can be encoded on behalf of the agent station 140 into a transfer encoding, such as base 64 UUencoding or a similar encoding, on behalf of the agent station 140.

At a step 222, the agent 142 directs the agent station 140 to particularize untethered mobile apps 111. When those untethered mobile apps 111 are particularized to provide tethered mobile apps 111 that are tethered to the agent's associated target, the tethering store 130 can provide (such as publish the availability of) those tethered mobile apps 111 to the particular agent 142 that requested those tethered mobile apps 111 to be provided, or to other agents 142 associated with other targets.

Alternatively, the developer 112 can provide tethering data 144 directly to the agent station 140. For example, the developer 112 can do so at the request of the agent station 140, at the request of the agent 142 (such as made by email, phone, or another out-ofband communication technique), in response to a triggering event (such as in response to a business arrangement between the developer 112 and the particular target, or in response to the tethering store 130 detecting use by the agent 142 and informing the developer 112), or in other circumstances that allow the developer 112 to provide tethering data 144.

The agent station 140 can send a request to modify mobile apps 111 into mobile apps 111 tethered to the selected target. Alternatively, the agent station 140 can send a request to developers 112 associated with untethered mobile apps 111. This alternative can have the effect that the developer 112 responds by providing at least some of the tethering data 144 to the agent station 140 or to the tethering server 150. For example, the developer 112 can maintain past tethering data 144 from past tethering operations, and respond by providing that past tethering data 144 to the agent station 140 or to the tethering server 150.

When the agent station 140 requests tethering of untethered mobile apps 111, this step can be performed in three parts: a part 222a, a part 222b, and a part 222c.

At the part 222a, the tethering server 150 can unwrap the app package for the mobile app 111 into components. In one possible implementation, the mobile app 111 can be built at least in part by wrapping components into a combined file, similar to the process employed by ZIP (and other compression programs) that compress multiple component files into a single file that is smaller than the sum of the size of the component files. In such cases, when the tethering server 150 unwraps the app package for the mobile app 111, the tethering server 150 maintains a record of component dependencies, such as in a tree structure or hierarchy, or in another graph-theoretic dependency form (where a "graph-theoretic" form refers to a computer science construct in which objects can point to objects: that is, objects can point to other objects, and objects can even point to themselves).

The tethering server 150 also confirms the validity of components and dependencies in the app package associated with the mobile app 111. For example, the tethering server 150 can confirm the validity of components in the app package by confirming that their secure hash value is equal to a hash value maintained elsewhere in the app package for the mobile app 111, or maintained in a known accessible database. For another example, the tethering server 150 can confirm the validity of dependencies by confirming that each component in the app package has a dependency chain to another component in the app package that is also valid, and that the dependency chain has no loops. For another example, the tethering server 150 can confirm the validity of components and dependencies by identifying a public-key signature for each component in the app package, and by confirming that the public-key signature for each component in the app package is correct when the component includes those subcomponents that had been wrapped into the component.

At the part 222b, the tethering server 150 can insert the tethering data 144 into the app package for the mobile app 111. This can have the effect of providing a particularized app package associated with the mobile app 111, tethered to the particular target associated with the requesting agent server 140 or its agent 142. While this Application primarily describes the tethering server 150 "inserting" the tethering data 144 into the app package for the mobile app 111, in the context of the invention, there is no particular requirement for any such limitation. For example, the tethering server 150 can append the tethering data 144 to the app package. For another example, the tethering server 150 can insert or append a pointer to the tethering data 144, such as a URL to a location available using the internet. For another example, the tethering server 150 can insert or append a value which, when decoded or decrypted, or when presented to a database server (not shown), can provide at least a portion of the tethering data 144.

In one possible implementation, the tethering server 150 can replace at least some data associated with untethered (or re-tetherable) mobile apps 111 with tethering data 144. In one possible implementation, when the tethering data 144 includes metadata for the associated app packages, the metadata not itself having an effect on operation of untethered mobile apps 111, the tethering server 150 can replace that metadata on the tethering store 130 or at a database server (not shown). In such cases, the metadata can include a name for the mobile app 111, an icon associated with the mobile app 111, or other identifying or descriptive information. This can have the effect that untethered mobile apps 111 with names not associated with any particular target can be modified to be tethered mobile apps 111, tethered with names specifically associated with particular targets.

In one possible implementation, the tethering server 150 can replace data in untethered (or re-tetherable) mobile apps 111 with tethering data 144. For example, when the tethering data 144 includes data defining one or more splash screens, the tethering server 150 can replace splash screens found in app packages associated with untethered mobile apps 111 with tethering data 144. For another example, when the tethering data 144 includes a color scheme, the tethering server 150 can replace color values found in app packages associated with untethered mobile apps 111 with tethering data 144. This can have the effect that untethered mobile apps 111 with color schemes or splash screens not associated with any particular target can be modified to be tethered mobile apps 111 with color schemes or splash screens specifically associated with particular targets.

In one possible implementation, the tethering server 150 can replace data in app packages associated with untethered (or re-tetherable) mobile apps 111 with calls out to an API (application programming interface), SDK (software development kit), or external server (such as the database server, not shown). This can have the effect that tethered mobile apps 111, tethered to particular targets, do not keep the original values (or spaces for holding values) of their associated untethered mobile apps 111, but instead use values specific to particular targets.

For example, when tethered mobile apps 111 provide a color value or splash screen, those tethered mobile apps 111 can call upon the API or SDK or database server, with an identifier of the color value (e.g., "background color") or splash screen (e.g., "welcome screen"), with specific values to be used for those color values or splash screens maintained in a resource fork (or equivalent) of the tethered mobile apps 111.

For another example, untethered mobile apps 111 can provide one or more "hooks" at which specific features or functions can be inserted by the tethering server 150. In such cases, the tethering server 150 can insert new code segments into the tethered mobile app 111 to perform a new feature or function, whether or not already planned for by the developer 112. The tethering server 150 can cause one or more such hooks to call upon new code segments. This can have the effect that the tethered mobile app 111 can perform new features or functions specific to particular targets, even when the developer 112 had no idea that those features or functions were desired, and even when the developer 112 has no idea that those features or functions have been inserted into the tethered mobile app 111.

While this Application primarily describes a system including a tethering server 150 that can tether a mobile app 111 to a particular one target, in the context of the invention, there is no particular reason for any such limitation. For example, it is possible for a mobile app 111 to be tethered concurrently to more than one particular target. In such cases, the tethering server 150 can use a first portion of tethering data 144 disposed to tether the mobile app 111 to a first target, and a second portion of tethering data 144 disposed to tether the mobile app 111 to a second target. One such case can involve the tethering server 150 modifying the mobile app 111 to include a first set of features or functions tethered to the first target, and a second set of features or functions tethered to the second target, where the first and second sets of features or functions are not inconsistent.

For another example, it is possible for a mobile app 111 to be tethered concurrently, by tethering the mobile app 111 to a first target in response to a first triggering event, and to a second target in response to a second triggering event. One such case can involve an interaction with the end-user 161, in which the mobile app 111 configures itself to either a first or second target in response to the end-user's preference. Another such case can involve a time-responsive change, in which the mobile app 111 configures itself to a first target during a first portion of the day and to a second target during a second portion of the day.

For another example, it is possible for concurrent tethering to be performed hierarchically. In such cases, a first class of app packages for mobile apps 111 can be tethered to one or more particular targets of a first type. Thus, the first type of targets can include "financial institutions," which are a more specific type than the general class of targets. A second class of app packages for mobile apps 111 can be tethered, within that first class, to more-specific particular targets of a second type. Thus, the second type can include "credit unions," which are a more specific type than the general class of financial institutions. A third class of app packages for mobile apps 111 can be tethered, within that second class, to more-specific particular targets of a third type. Thus, the third type can include the "Hogwarts & Hogsmead Credit Union™," which is more specific than the general class of credit unions.

At the part 222c, the tethering server 150 can rewrap the app package associated with the mobile app 111 from its components, providing an installable app package for a tethered mobile app 111. In one possible implementation, the tethering server 150 can rewrap each particular component to include all data and metadata needed by that particular component, including all other components that particular component is dependent upon. In such cases, when multiple separate components depend from a single other component, the tethering server 150 can rewrap that single other component at a similar hierarchical level as the multiple separate components, and designate the proper dependency in the metadata of those multiple separate components.

At a step 223, the agent station 140 (or alternatively, the tethering server 150) submits one or more tethered mobile apps 111 to the tethering store 130. Alternatively, developers 112 can submit one or more tethered mobile apps 111 directly to the tethering store 130. The tethering store 130 approves tethered mobile apps 111, publishes availability of the tethered mobile apps 111 to the agent station 140, and presents app packages associated with the tethered mobile apps 111 for download.

At a step 224, the agent 142 can download app packages associated with tethered mobile apps 111, onto the agent station 140 or onto the agent mobile device 143, for installation and testing. Upon download and installation, the agent 142 can execute or interpret the tethered mobile apps 111. This can have the effect that the agent 142 can determine if the tethered mobile apps 111 are properly tethered to their particular target, or whether the tethered mobile apps 111 should be re-tethered, further modified, or otherwise improved.

END-USER USE OF MOBILE APPS: At a flow point 230, the method 200 is ready to provide one or more tethered mobile apps 111, each tethered to a particular target, to end-users 161 at end-user stations 160.

At a step 231, the end-user 161 selects one or more tethered mobile apps 111, and possibly also untethered mobile apps 111, to be installed onto the end-user mobile device 162. Alternatively, the end-user 161 can select mobile apps 111, whether tethered mobile apps 111 or untethered mobile apps 111, from another source, such as another type of store, another download location such as a web site, or a coupleable storage element, to install onto the end-user mobile device 162.

At a step 232, the end-user 161 directs the app store 120 to download the app packages for the selected mobile apps, whether tethered mobile apps 111 or untethered mobile apps 111, to the end-user mobile device 162. Alternatively, the end-user 161 can direct another source, such as another type of store, another download location such as a web site, or a coupleable storage element, to download the app packages for the mobile apps 111 onto the end-user mobile device 162.

At a step 233, the end-user 161 installs the mobile apps 111, using the downloaded app packages. Upon installation, the end-user 161 invokes and operates the mobile apps 111, whether tethered mobile apps 111 or untethered mobile apps 111. Mobile apps 111, whether tethered mobile apps 111 or untethered mobile apps 111, can couple to the app server 170 to perform financial operations therewith, or alternatively, can couple to other devices, or no device at all, at the mobile apps' choice.

At a step 234, the app server 170 informs the tethering store 130 that the tethered mobile app 111 has been downloaded to the end-user station 160 and used by the end-user 161. The tethering store 130 informs the target of the event; the target determines, either with or without assistance of an external device, how much and when to pay the developer 112 for use of the mobile app 111 tethered to the selected target.

For example, the target can determine to pay the developer 112 whenever a triggering condition occurs defined by an agreement between the target and the developer 112, or between the target and the vendor. In such cases, the triggering condition can be any one or more of:
  (A) A new download occurs for an app package associated with the tethered mobile app 111.
  (B) An installation occurs for the tethered mobile app 111.
  (C) A new first use occurs for an installed tethered mobile app 111; thus, payment would be made when the tethered mobile app 111 is downloaded, installed, and used.

(D) A new end-user 161 installs the tethered mobile app 111; thus, payment would be made when the tethered mobile app 111 is both downloaded and installed by a distinct new user.

(E) A new use by the end-user 161 occurs; thus, payment would be made for each use of the tethered mobile app 111.

(F) A new transaction occurs between the tethered mobile app 111 and the app server 170; thus, payment would be made for each transaction by the end-user 161 with the app server 170 that uses the tethered mobile app 111.

Other and further payment arrangements are possible, are within the scope of the invention, and would be clear to those skilled in the art, without undue experiment or new invention.

While this Application primarily describes the mobile app 111 as interfacing with the app server 170, in the context of the invention, there is no requirement for any such limitation. For example, it is also possible that the mobile app 111 interfaces with differing servers, such as the mobile app 111 might choose from time to time. In such cases, payment for the mobile app 111 interfacing with the app server 170 might not be appropriate; it might instead be appropriate to arrange payment for each access by the mobile app 111 to any server, or using the internet, or using a wireless connection, or by other techniques for communication. For another example, it is also possible that the mobile app 111 does not interface with any other device (such as if the mobile app 111 includes a game, a note-taking app, a local database, or a local utility). In such cases, payment for the mobile app 111 interfacing with another device might not be appropriate; it might instead be appropriate to arrange payment for each access by the end-user 161 to the mobile app 111 itself.

2A—Interface to Tethering Store

Figure 2A:
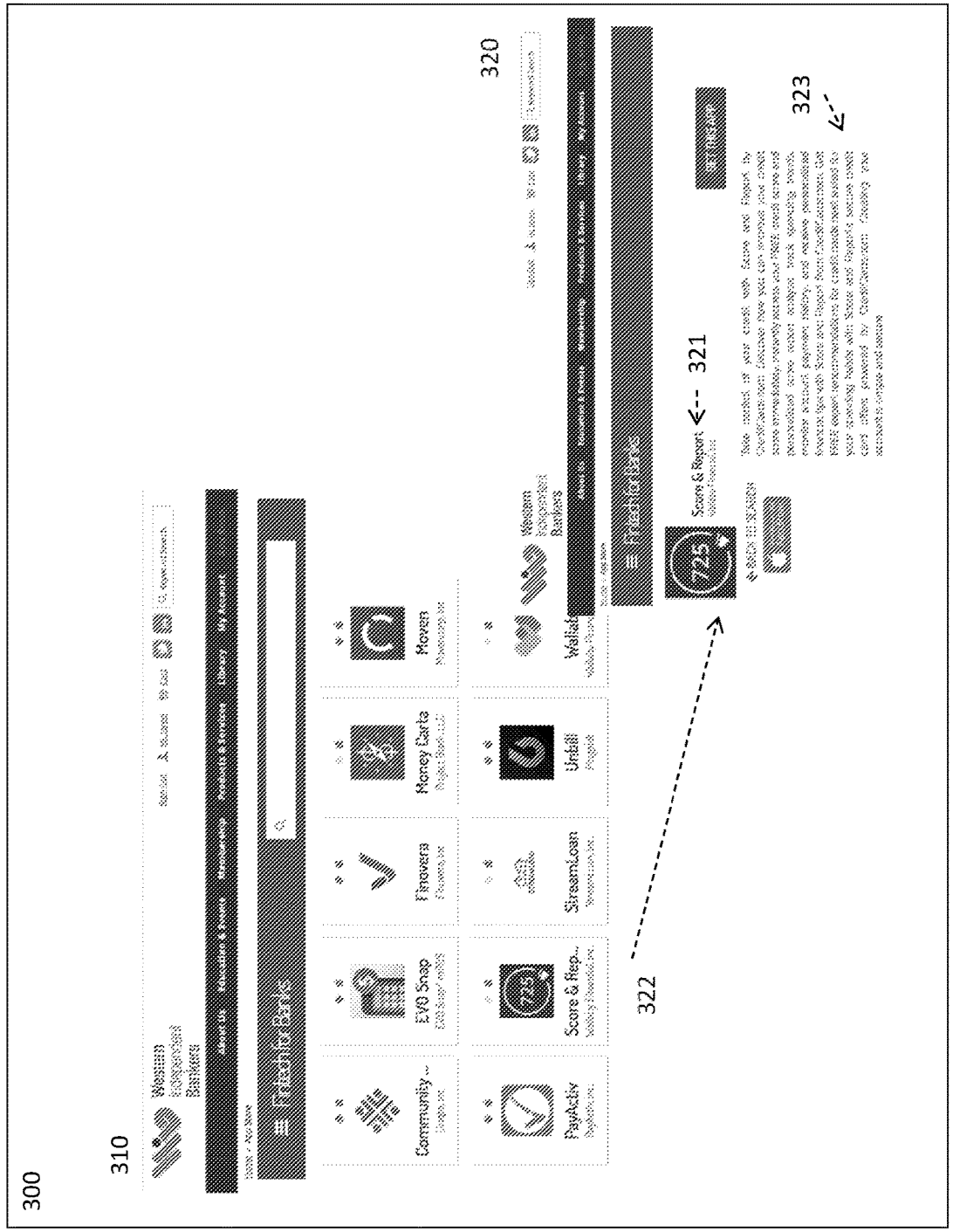
FIG. 2A shows a conceptual drawing of an interface to a tethering store.

FIG. 2A shows a conceptual drawing of an interface to a tethering store.

In one possible implementation, the agent station 140 and the agent 142 can couple to the tethering store 130 using a user interface 300. The user interface 300 can include elements as shown in the figure, as well as possible other elements, including at least: one or more mobile app descriptors 310, each including mobile app metadata 320.

In one possible implementation, the mobile app metadata 320 can include: an app name 321 (such as a text string), an app icon 322 (such as a picture element) (shown in FIG. 2B), an app description 323 (such as a text string of possibly paragraph length) (shown in FIG. 2B). The mobile app metadata 320 can be presented on an output device, such as a screen or other known computer output devices, for review by the agent 142 or by others.

In one possible implementation, the agent 142 can obtain further information about each mobile app 111, whether untethered mobile apps 111 or untethered mobile apps 111, such as by requesting that information from the agent station 140, which can obtain that information from the tethering store 130. For example, the tethering store 130 can cache information about mobile apps 111 currently presented on the screen. For another example, the agent 142 can mouse over a section of the screen that is presenting a particular mobile app 111, or can type into a user interface, to obtain further information about that particular mobile app 111.

2B—Interface to Modify Mobile App

FIG. 2B shows a conceptual drawing of an interface to modify mobile apps.

In one possible implementation, the agent station 140 and the agent 142 can couple to the tethering store 130 using the user interface 300, and select one or more untethered mobile apps 111 for tethering to the agent's particular target (or select one or more tethered mobile apps 111 for re-tethering to the agent's particular target). In the example shown in the figure, the agent 142 has selected one such mobile app 111.

For example, the agent station 140 can obtain, from the tethering store 130, fields into which tethering data 144 can be inserted. The user interface 300 can present those fields to the agent 142, possibly with suggestions for values to provide as tethering data 144. The tethering data 144 can include elements as shown in the figure, as well as possible other elements, including at least: a new name 331, a new icon 332, a set of new other metadata 333, a set of new values 334 (or pointers to new values), a set of pointers to new features or functions 335, for the untethered mobile app 111 to be modified (or for a tethered mobile app 111 to be further modified).

In such cases, the mobile app 111 can be modified by associating new metadata with the app package associated therewith, or by inserting new values or new features or functions into that associated app package, to provide the tethered or re-tethered mobile app 111. For example, the mobile app 111 (or at least the app package for that mobile app 111) can have new features or functions added to it by inserting new code segments into areas reserved for those new code segments, where the original untethered mobile app 111 included hooks: calls by the developer 112 to new code segments to be written after the original untethered mobile app 111 was completed.

2C—Database Entry

Figure 2C:
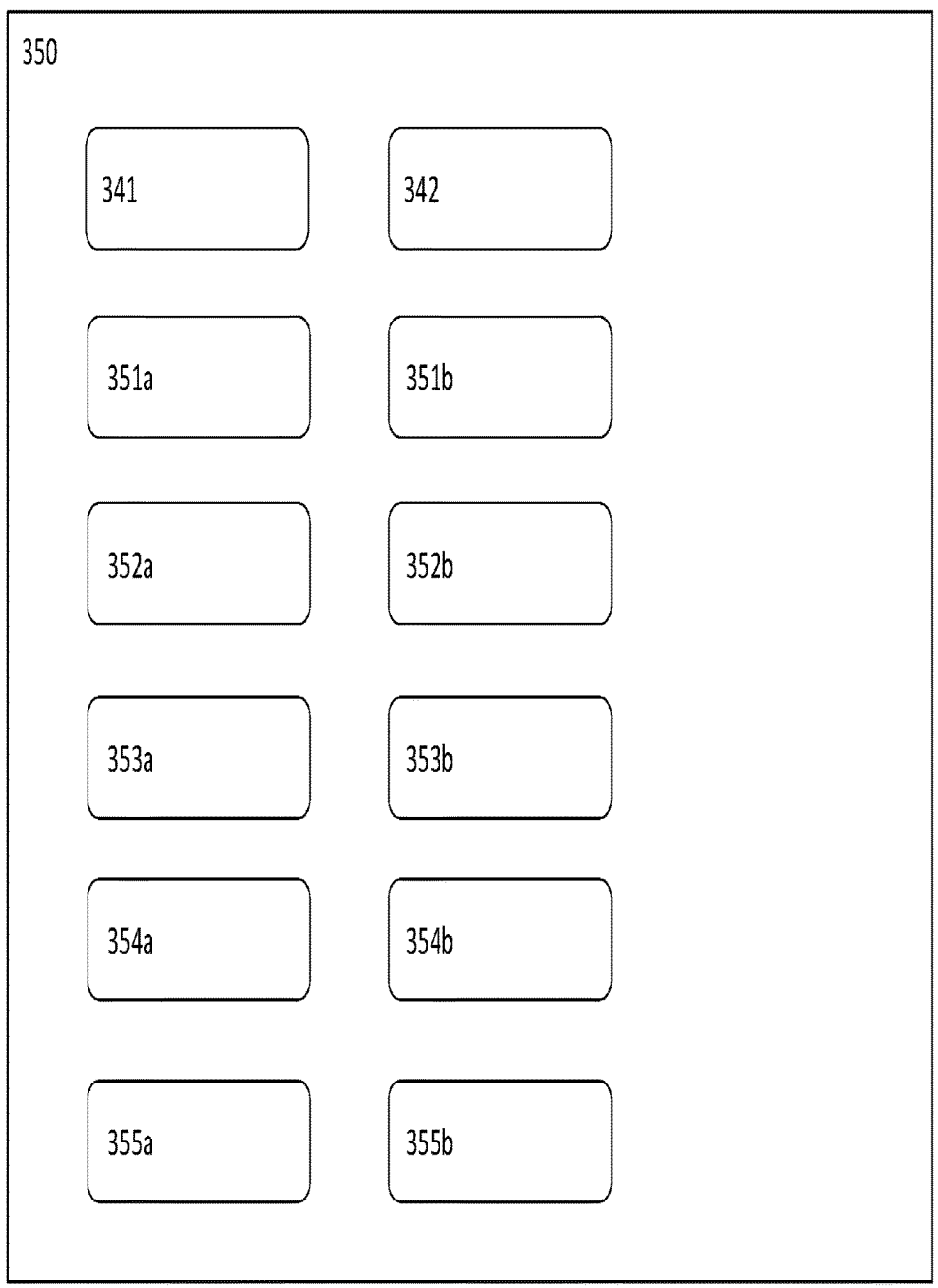
FIG. 2C shows a conceptual drawing of a database entry for tethering data.

FIG. 2C shows a conceptual drawing of a database entry for tethering data.

In one possible implementation, the agent station 140 and the agent 142 can couple to the tethering store 130 using the user interface 300, and receive one or more database entries 340 for tethering data 144. In the figure, a database entry 340 is encoded in JSON format; however, in the context of the invention, there is no particular reason for any such limitation. The database entry 340 can include data encoded in an XML format (or a variant thereof), or any other format providing for the implementation of the functions as otherwise and further described herein. The tethering store 130 or the agent station 140 can decode the database entry 340 and present it using the user interface 300, such as on the screen.

In one possible implementation, database entry 340 can include elements as shown in the figure, as well as possible other elements, including at least: the new name 331 (including a name variable 341a and a string value 341b therefor), a new icon 332 (including an icon variable 342a and a string value 342b therefor), a version number 343 (including an version variable 343a and a numeric value 343b therefor), a set of code for a new feature or function 344 (including a code variable 344a and a UUencoded string 344b therefor), and possibly other tethering data 345 (including other variable names 345a and encoded variable values 345b therefor).

2D—Structure of App Package for Mobile App

FIG. 2D shows a conceptual drawing of a structure of an app package for a mobile app.

In one possible implementation, an app package associated with the mobile app 111 can be structured in a hierarchical structure 350, such as a tree structure or a directed acyclic graph (a "DAG"), as those structures are known in the art of computer science. The structure 350 can include elements as shown in the figure, as well as possible other elements, including at least: one or more code elements 351, one or more picture elements 352 (such as icons or emoji), one or more string elements 353 (such as names, screen titles or captions, messages, or other text to be presented by the mobile app 111), and one or more other elements 354 (such as possibly URLs, i.e., "uniform resource locators," pointing to web sites or other resources available on the internet.

As otherwise and further described herein, each of the elements of the structure 350 can be modified, or elements can be added to or subtracted from the structure 350, to tether untethered mobile apps 111 (or re-tether tethered mobile apps 111) to a particular target.

3—System

Figure 3:
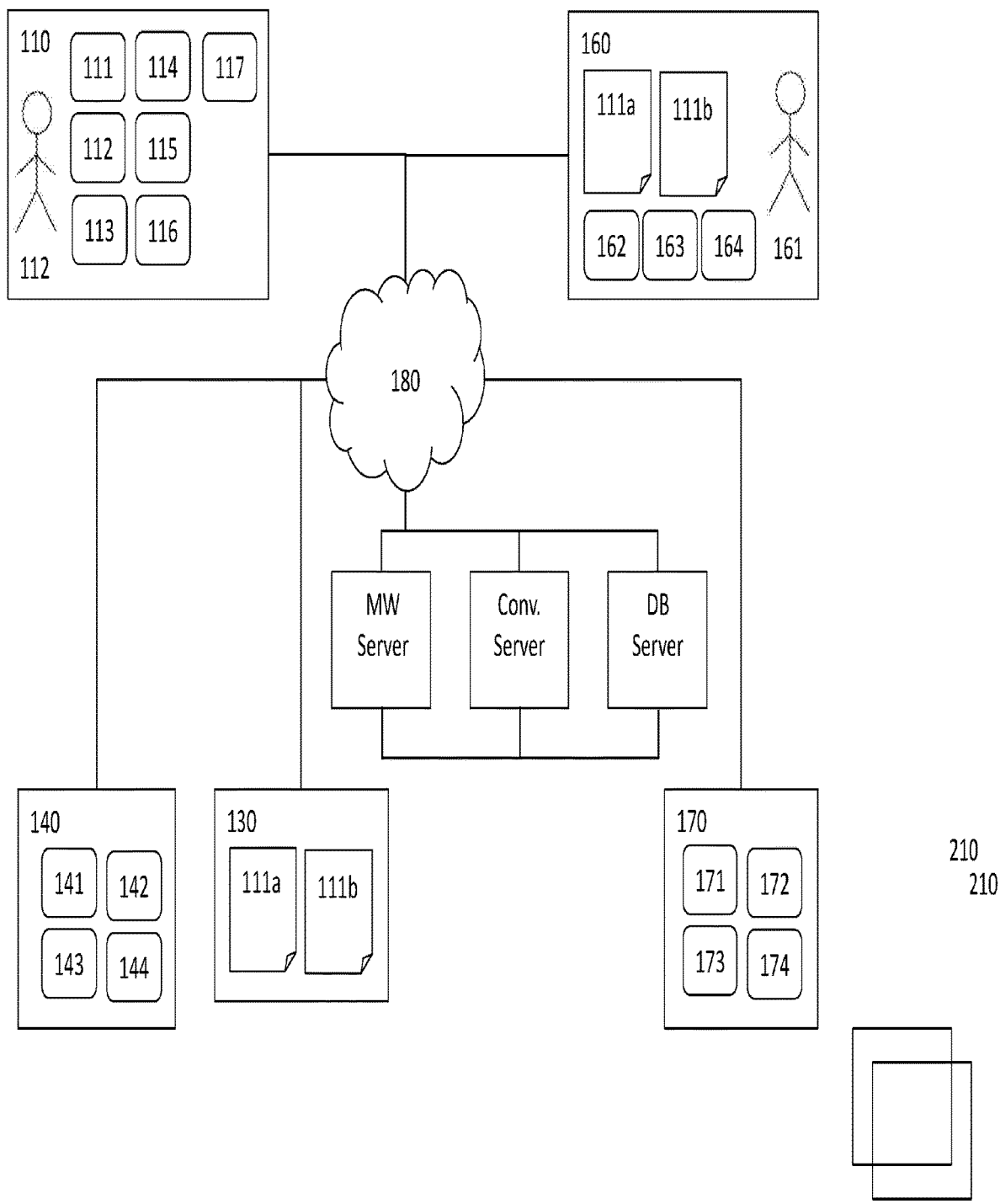
FIG. 3 shows a conceptual drawing of a system.

FIG. 3 shows a conceptual drawing of a system.

In one possible implementation, a system 400 can include elements as shown in the figure, as well as possible other elements, including at least: the developer site 110, the app store 120, the tethering store 130, the agent station 140, the tethering server 150, the end-user station 160, the app server 170, and a communication network 180.

DEVELOPER SITE: As otherwise and further described herein, the developer site 110 can include elements as shown in the figure, and as otherwise and further described herein, as well as possible other elements, including at least: the mobile app 111 created by the developer 112, having one or more locations 113 at which the mobile app 111 can be modified. The developer site 110 can also include: a processor 114; non-transitory storage 115 capable of maintaining the mobile app and also capable of maintaining instructions and data for the processor 114; a development environment 116 capable of compiling, executing, interpreting, or debugging the mobile app 111; and a developer mobile device 117 capable of downloading, installing, and operating the mobile app 111, and capable of coupling to a telephone network (not shown).

In one possible implementation, the developer 112 can create an untethered (or re-tetherable) mobile app 111, maintained in the development environment 116. The development environment 116 can include sufficient software support that the developer 112 can operate the mobile app 111 as if the mobile app 111 were actually installed in a mobile device 117. The developer 112 can also package the mobile app 111 into an app package, send the app package to the mobile device 117, install the mobile app 111 on the mobile device 117 using the app package, and test the mobile app 111 directly on the mobile device 117.

APP STORE: As otherwise and further described herein, the app store 120 can include elements as shown in the figure, and as otherwise and further described herein, as well as possible other elements, including at least: untethered mobile apps 111 and tethered mobile apps 111, as otherwise and further described herein.

In one possible implementation, the app store 120 can maintain app packages for the mobile apps 111 from the developer site 110 (or, as described above, otherwise from the developer 112, or from the vendor). In such cases, the app store 120 can receive requests for lists of those mobile apps 111, to which it responds by providing a list of apps it maintains. The app store 120 can also receive requests for those mobile apps 111, to which it responds by providing app packages associated with those mobile apps 111. When another element (such as the agent 142 or the end-user 161) requests a selected mobile app 111, that element receives an app package associated with that mobile app 111, from which that element can install that mobile app 111 on its own mobile device (such as an agent mobile device 143 or the end-user mobile device 162.

TETHERING STORE: As otherwise and further described herein, the tethering store 130 can include elements as shown in the figure, and as otherwise and further described herein, as well as possible other elements, including at least: untethered mobile apps 111 and tethered mobile apps 111, as otherwise and further described herein.

The tethering store 130 can include one or more mobile apps 111, possibly including untethered mobile apps 111 and tethered mobile apps 111. More specifically, the tethering store 130, similarly to the app store 120, is said to "include mobile apps" when it includes app packages for those mobile apps 111. The tethering store 130 can receive untethered mobile apps 111 and their associated app packages from the app store 120. In such cases, the tethering store 130 can present those untethered mobile apps 111 to one or more agents 142.

In one possible implementation, similar to the app store 120, the tethering store 130 can maintain app packages associated with the mobile apps 111 from the app store 123. In such cases, similar to the app store 120, the tethering store 130 can receive requests for lists of those mobile apps 111, to which it responds by providing a list of apps it maintains. Similar to the app store 120, the tethering store 130 can also receive requests for those mobile apps 111, to which it responds by providing app packages for those mobile apps 111. Similar to the app store 120, when the tethering agent 150 requests a selected mobile app 111, the tethering agent 150 receives an app package associated with that mobile app 111, from which the tethering agent 150 can tether (or re-tether) that mobile app 111 to the target.

AGENT STATION: As otherwise and further described herein, the agent station 140 can include elements as shown in the figure, and as otherwise and further described herein, as well as possible other elements, including at least: the thin client 141, the agent 142, the agent mobile device 143 (not necessarily contained within the agent station 140, but possibly coupleable to the agent 142), and the tethering data 144.

As described otherwise and further herein, the agent station 140 can include a "thin" client 141, with which the agent 142 can interact with the tethering store 130. The agent station 140 can also include an agent mobile device 143, such as a smartphone or any other type of mobile device, as otherwise and further described herein. When the agent 142 attempts to download a selected mobile app 111 to the agent mobile device 143, it receives an app package associated with that selected mobile app 111, with which it can install the selected mobile app 111 on the agent mobile device 143.

TETHERING SERVER: As otherwise and further described herein, the tethering server 150 can include elements as shown in the figure, and as otherwise and further described herein, as well as possible other elements, including at least: untethered mobile apps 111 and tethered mobile apps 111, as otherwise and further described herein.

The tethering server 150 can receive copies of app packages associated with one or more untethered (or re-tetherable) mobile apps 111, plus tethering data 144 with which it can tether or re-tether those mobile apps 111. The tethering server 150 tethers or retethers those mobile apps 111 to the target, thus providing a tethered mobile app 111. The tethering server 150 can create an app package associated with the tethered mobile app 111, which can be sent to the tethering store 130 and to the app store 120. One or more end-users 161 can download the app package associated with the tethered mobile app 111 from the app store 120, install the tethered mobile app 111 onto the end-user mobile device 162, and use the tethered mobile app 111.

As noted herein, the tethered mobile app 111 can interact with the app server 170. In one possible embodiment, the app server 170 is associated with or controlled by the target. However, while this Application primarily describes a system in which the app server 170 is so associated with the target, in the context of the invention, there is no particular requirement for any such limitation. As described herein, the app server 170 need not be associated with or controlled by the target, and there need not be an app server 170 at all. For example, the tethered mobile app 111 can operate without any app server 170.

END-USER STATION: As otherwise and further described herein, the end-user station 160 can include elements as shown in the figure, and as otherwise and further described herein, as well as possible other elements, including at least: the end-user 161; untethered mobile apps 111 and tethered mobile apps 111, as otherwise and further described herein; the end-user mobile device 162 (not necessarily contained within the end-user station 160, but possibly coupleable to the end-user 161); the other end-user devices 163, as otherwise and further described herein; the sign-on data 164.

As described herein, the end-user station 160 is associated with an end-user 161, and can include a tethered mobile app 111 tethered to a selected target. The end-user station 160 can also include an end-user mobile device 162, such as a smartphone or any other type of mobile device, as otherwise and further described herein, on which the tethered mobile app 111 is installed. As described herein, the end-user station 160 (more specifically, the end-user mobile device 162) receives an app package associated with the tethered mobile app 111, from which it installs the tethered mobile app 111 on the end-user mobile device 162.

As described herein, the end-user 161 can use the end-user mobile device 162 to operate the tethered mobile app 111 with the app server 170. In one possible embodiment, the tethered mobile app 111 can maintain server sign-on data 164 on behalf of the end-user 161, with the effect that the end-user 161 need only sign-on once: (0) to the tethered mobile app 111 by entering mobile app sign-on data, and (2"$^d$) with the assistance of the tethered mobile app 111 by providing stored server sign-on data 164 to the app server 170.

In one possible embodiment, the app sign-on data for the end-user 161 to invoke the tethered mobile app 111 and the server sign-on data 164 for the end-user 161 to use the app server 170 can be the same. Alternatively, the app sign-on data for the end-user 161 to invoke the tethered mobile app 111 can be different from the server sign-on data 164 for the end-user 161 to use the app server 170 (the latter of which is maintained by the tethered mobile app 111).

APP SERVER: As otherwise and further described herein, the app server 170 (not necessarily associated with or controlled by the target, but possibly otherwise associated or controlled) can include elements as shown in the figure, and as otherwise and further described herein, as well as possible other elements, including at least: a sign-on interface 171, as otherwise and further described herein; a user interface 172, as otherwise and further described herein; one or more databases 173, as otherwise and further described herein; and one or more end-user accounts 174. In such cases, the end-user accounts 174 can include information sufficient to perform the operations the target performs with respect to its relationship with the end-user 161. In such cases, that information with respect to the end-user accounts 174 can be maintained in one of more of the databases 173.

However, as described herein, the app server 170 need not be associated with the target, or controlled by the target; the app server 170 can include a multitude of servers that the end-user 161 can contact, or there need not be any app server 170 at all. For example, the tethered mobile app 111 can operate independently of any external devices. In such cases, the mobile app 111 can be tethered to the target by virtue of particular features or functions provided by the tethered mobile app 111, or by virtue of metadata included in or associated with the tethered mobile app 111.

In one possible implementation, the app server 170 sign-on interface 171 can maintain one or more sets of sign-on data for associated users, at least one of which includes the sign-on data 164 maintained by the tethered mobile app 111. When the end-user 161 signs onto the tethered mobile app 111, the tethered mobile app 111 can either (A) send the same app sign-on data to the app server 170 as the server sign-on data 164, or (B) send the sign-on data 164 it maintains within the tethered mobile app 111 as the server sign-on data 164.

While this Application primarily describes use of the tethered mobile app 111 to maintain constant server sign-on data 164 for the app server 170, in the context of the invention, there is no particular requirement for any such limitation. For example, the value referred to herein as "server sign-on data" 164 can include a seed for a pseudo-random number generator, an encryption key, or other shared secret suitable for secure communication between the tethered mobile app 111 and the app server 170. For another example, the value referred to herein as "server sign-on data" 164 can include instructions or data for manipulating the app sign-on data, or for manipulating publicly-available data, to provide a value accepted by the app server 170 as server sign-on data 164.

The communication network 180 can couple to and intercommunicate between elements as shown in the figure, as well as possible other elements, including at least: the developer site 110, the app store 120, the tethering store 130, the agent station 140, the tethering server 150, the end-user station 160, and the server 170.

Alternative Embodiments

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the scope and spirit of the claimed subject matter.

The invention claimed is:

1. A system for modification of computer programs, including
a tethering store maintaining a mobile app package including specific binary object code and disposed for execution on a mobile device to interface with a predetermined app server;
an agent station coupled to the tethering store and disposed to receive tethering data to particularize the executable specific set of binary object code to the predetermined app server that is disposed to be included with the specific binary object code into a tethered mobile app package, wherein the tethered mobile app package is disposed to operate using the specific binary object code and the tethering data to access the predetermined app server;

the tethering data including user-displayable media descriptions accessible by the specific binary object code and specific to the predetermined app server, and specifications of new functions;

wherein the tethering store is disposed to provide the tethered mobile app package capable of accessing the predetermined app server in response to the mobile device.

2. A system as in claim 1, including
a mobile app concurrently tethered to more than one particular selectable target.

3. A system as in claim 2, wherein
the mobile app concurrently tethered to more than one particular selectable target is concurrently tethered to a first and a second class of selectable targets, the first class of selectable targets including the second class of selectable targets.

4. A system as in claim 2, including
a mobile app tethered to a first selectable target in response to a first triggering event, and tethered to a second selectable target in response to a second triggering event.

5. A system as in claim 4, including
a mobile app tethered to a first selectable target in response to a first triggering event, and tethered to a second selectable target in response to a second triggering event;
wherein the mobile app includes first sign-on data disposed to be accepted by a first app server, the first sign-on data being used in response to a first triggering event, and includes second sign-on data disposed to be accepted by a second app server, the second sign-on data being used in response to a second triggering event.

6. A system as in claim 1, including
a mobile app tethered to a particular one selectable target, the mobile app including sign-on data disposed to be accepted by an app server.

7. A system as in claim 6, wherein
the mobile app includes sign-on data disposed to be accepted by an app server to authorize an end-user, the sign-on data including data values equal to sign-on data disposed to be accepted by the mobile app itself.

8. A system as in claim 1, including
a mobile device coupled to the agent station, the mobile device being disposed to receive one or more sets of instructions and data from the tethering store in a downloadable form, wherein the downloadable form includes, in response to a signal from the agent, one of:
a mobile app not tethered to any particular one selectable target,
a mobile app tethered to a particular one selectable target,
a mobile app tethered to a plurality of selectable targets.

9. A mobile device including a tethered mobile app package having an executable specific set of binary object code and tethering data to particularize the executable specific set of binary object code to a target;
wherein the tethered mobile app package is disposed for execution on the mobile device using the specific set of binary object code and tethering data with respect to a predetermined mobile app server;
wherein the predetermined mobile app server is associated with the specific set of tethering data;
wherein the tethering data is disposed to restrict use of the tethered mobile app package for use with the predetermined mobile app server, and specify new functions.

10. A mobile device as in claim 9, wherein
at least some of the tethering data provides one or more features or functions not available from the program after the program was published for availability to an agent,
the features or functions being disposed to operate only with the particular selected server of that known type.

11. A method of modifying computer programs, including steps of
receiving a computer program in a format suitable for execution or installation on a known computing device, the program including instructions and data interpretable by the computing device, the program operative to interface the computing device with a known type of server;
maintaining a mobile app package, including a set of specific binary object code, disposed for execution on a mobile device to interface with an app server;
receiving tethering data identified with the predetermined app server to particularize the executable specific set of binary object code to the predetermined app server;
combining the specific binary object code with the tethering data into a tethered mobile app that is disposed to operate to access the predetermined app server;
the tethering data including user-displayable descriptions accessible by the specific binary object code and specific to the predetermined app server, and specifications of new functions;
in response to the mobile device, accessing the predetermined app server using the tethered mobile app package.

12. A method as in claim 11, including steps of
concurrently tethering the instructions and data to more than one particular selectable target.

13. A system as in claim 12, wherein
the steps of concurrently tethering include steps of
concurrently tethering the instructions and data to a first and a second class of selectable targets, the first class of selectable targets including the second class of selectable targets.

14. A system as in claim 12, wherein
the steps of concurrently tethering include steps of
concurrently tethering the instructions and data to a first selectable target in response to a first triggering event, and to a second selectable target in response to a second triggering event.

15. A system as in claim 14, wherein
the steps of concurrently tethering include steps of
concurrently tethering the instructions and data to a first selectable target in response to a first triggering event, and to a second selectable target in response to a second triggering event;
disposing first sign-on data to be accepted by a first app server, the first sign-on data being used in response to a first triggering event, and disposing second sign-on data to be accepted by a second app server, the second sign-on data being used in response to a second triggering event.

16. A method as in claim 11, including steps of
tethering the instructions and data to a particular one selectable target, the tethering data including sign-on data disposed to be accepted by a particular one server.

17. A method as in claim 16, wherein
the tethered instructions and data include sign-on data disposed to be accepted by the particular one server to authorize an end-user, the sign-on data including data values equal to sign-on data disposed to be accepted by the mobile app itself.

18. A method as in claim 11, including steps of maintaining the received instructions and data at a tethering store including non-transitory memory;

providing an interface between an agent station and the tethering store, the agent station being associated with a particular one selectable target;

providing tethering data from the agent station, and the instructions and data from the tethering store, to a tethering server;

performing the steps of identifying and replacing at the tethering server;

providing a modified set of instructions and data to the tethering store.

19. A method as in claim 18, including steps of coupling a mobile device to the agent station;

receiving, at the mobile device, one or more sets of instructions and data from the tethering store in a downloadable format, wherein the downloadable format includes, in response to a signal from the agent, one of:

a mobile app in a downloadable format, not tethered to any particular one selectable target, a mobile app in a downloadable format, tethered to a particular one selectable target, a mobile app in a downloadable format, tethered to a plurality of selectable targets.

20. A method as in claim 11, wherein the tethering data includes one or more of:

one or more color values or string constants included within a mobile app;

one or more URLs or other resource pointers included within a mobile app;

one or more of: authentication information, authorization codes, encryption/decryption codes, sign-on data;

one or more code segments included within a mobile app.

* * * * *